United States Patent
Tanaka et al.

[11] Patent Number: 5,434,693
[45] Date of Patent: Jul. 18, 1995

[54] OPTICAL SHORT PULSE GENERATING DEVICE

[75] Inventors: Hideaki Tanaka, Koganei; Satoru Takagi, Tokyo; Masatoshi Suzuki, Kawashima; Yuichi Matsushima, Tokorozawa, all of Japan

[73] Assignee: Kokusai Denshin Denwa Kabushiki Kaisha, Tokyo, Japan

[21] Appl. No.: 213,928

[22] Filed: Mar. 16, 1994

[30] Foreign Application Priority Data

Mar. 25, 1993 [JP] Japan .................. 5-089517

[51] Int. Cl.⁶ .......................................... H04B 10/04
[52] U.S. Cl. .................... 359/180; 359/162; 359/181; 372/26; 372/38
[58] Field of Search ........ 359/140, 160, 162, 180–181, 359/183; 372/26, 38; 385/2, 3, 8

[56] References Cited

U.S. PATENT DOCUMENTS 5,325,225  6/1994  Suzaki et al. ................ 359/187

OTHER PUBLICATIONS

Taga et al. "Bit Error Rate Measurement of 2–5 Gbit/s Data Modulated Solitons Generated by InGaAsP Modulator Using a Circulating Loop" Electronics Letters vol. 28, No. 13, Jun. 1992, pp. 1280–1281.

Suzuki et al. "Transform–Limited Optical Pulse Generation up to 20–GHz Repetition Rate by a Sinusoidally Driven InGaAsP Electroabsorption Modulator" Journal of Lightwave Technology, vol. 11, No. 3, Mar. 1993, pp. 468–473.

Primary Examiner—David K. Moore
Assistant Examiner—Kinfe-Michael Negash
Attorney, Agent, or Firm—Emmanuel J. Lobato

[57] ABSTRACT

An optical short pulse generating device is disclosed, in which semiconductor laser light of a fixed intensity is launched into a first semiconductor electroabsorption optical modulator which is driven by a 0V or forward bias voltage and a sinusoidal voltage, and the output light from the first optical modulator is launched into a second electroabsorption optical modulator to which is applied a bias voltage and a sinusoidal voltage having delayed from the said sinusoidal voltage for a period of time corresponding to the phase reversal thereof, whereby it is possible to generate optical short pulses of a repetition frequency twice higher than the oscillation frequency of a sinusoidal voltage generator.

3 Claims, 3 Drawing Sheets

OPTICAL SHORT PULSE GENERATING DEVICE

BACKGROUND OF THE INVENTION

The present invention relates to a soliton optical pulse generating device for high-speed fiber optic communication, an optical clock generating device for an optical information processing system, an ultra-high speed pulsed light source for photomerry and light source for optical sampling.

In the field of optical communication, an optical soliton communication has come to particular attention, with an increase in the transmission rate, as a substitute for conventional systems which use non-return-to-zero pulses that are susceptible to and adverse effect of wavelength dispersion and the influence of a nonlinear optical effect. The soliton optical communication is a system that positively utilizes the wavelength dispersion characteristic and nonlinear optical effect of optical fibers which are contributing factors to the degradation of characteristics of conventional transmission systems, and that transmits optical short pulses intact by balancing optical pulse spreading owing to the wavelength dispersion by the fiber and pulse compression based on the nonlinear optical effect. The optical short pulse is relatively easy of time multiplexing and wavelength multiplexing as well, and hence is suitable for high-speed transmission. This optical short pulse needs to be a transform limited pulse (a pulsed optical pulse of a spectrum corresponding to a Fourier transformation of an envelope waveform of an optical pulse); from the viewpoint of increasing the transmission rate, it is desirable that the limit repetition frequency of the optical pulse be as high as possible. To prevent interference between optical pulses, the pulses width may preferably be small. It is also necessary that the pulses be in susceptible to environmental conditions such as atmospheric temperature and like. Besides, the light source for optical sampling is required to be capable of changing the repetition frequency and the pulse width.

One possible means that meets with such requirements is a semiconductor electroabsorption optical modulator; since its extinction ratio, expressed in dB, bears a substantially linear relationship to the applied voltage, the semiconductor electroabsorption optical modulator is able to generate optical pulses having a virtually sech$^2$ geometry, by launching laser light of a certain intensity into the modulator and applying thereto a sinusoidal modulating voltage. Moreover the phase modulation component of the semiconductor electroabsorption optical modulator is so small that the pulses therefrom are transform limited pulses (Literature 1: Masatoshi Suzuki, "Ultra-Short Pulses for Optical Soliton Transmission", Research on Laser, Vol 20, No. 8, pp. 673–683, 1992). This system is hard to be influenced by atmospheric temperature and similar environmental conditions and allows ease in changing the pulse repetition frequency and the pulse width. A system in which two modulation elements are connected in cascade under applying thereto rectangular waveforms was proposed in Japanese patent laying-open No. 143721/86. The highest repetition frequency of the conventional optical pulse generation is the operation limit frequency of the semiconductor electroabsorption optical modulator.

SUMMARY OF THE INVENTION

An object of the present invention is to provide an optical short pulse generating device which obviates such problems of the prior art and which is able to generate optical pulses of up to the repetition frequency above the operation limit frequency of the optical modulator.

To attain the above object, the optical generating device of the present invention comprises: a continuously oscillating semiconductor laser; a first semiconductor electroabsorption optical modulator for intensity-modulating the output light from the semiconductor laser; a second electroabsorption optical modulator for intensity-modulating the output light from the first electroabsorption optical-modulator; a sinusoidal voltage generator for generating a sinusoidal voltage for driving the first and second electroabsorption optical modulators; a DC voltage generator for applying a 0 volt or forward DC voltage to the first and second electroabsorption optical modulators so that an optical gate width may be the same as or larger than the pulse repetition period; and a delay circuit inserted between the second electroabsorption optical modulator and the sinusoidal voltage generator to delay the sinusoidal voltage from the latter for a time long enough to reverse its phase.

In the above-mentioned optical pulse generating device according to the present invention, semiconductor laser light of a fixed output is launched into the semiconductor electroabsorption optical modulator driven by the 0 volt or forward bias voltage and the sinusoidal voltage, and the output light from the first semiconductor electroabsorption optical modulator is launched into the second electroabsorption optical modulator driven by the sinusoidal voltage having a time difference from the bias voltage and the sinusoidal voltage, caused by the phase reversal of the latter, whereby optical short pulses are generated which have a repetition frequency twice higher than the oscillation frequency of the sinusoidal voltage generator.

By driving it with the sinusoidal voltage, the semiconductor electroabsorption optical modulator can be caused to operate as an optical gate that rises and falls in short times, by virtue of the afore-mentioned nonlinear optical output characteristic. By setting the bias voltage to 0 volt or an appropriate forward voltage value, the time over which the gate remains completely enabled can be set to a value greater than the half of the oscillation repetition period of the sinusoidal voltage generator. Thus, only rise and fall portions of an optical pulse, cut out from the laser light of a fixed intensity by the optical gate operation of the first semiconductor electroabsorption optical modulator, coincide with only the rise and fall timing of the optical gate operation of the second semiconductor electroabsorption optical modulator, thus, generating optical short pulses of a repetition frequency twice higher than the oscillation frequency sinusoidal voltage generator. The pulse repetition frequency can be set to an arbitrary value by changing the frequency of the sinusoidal voltage generator.

BRIEF DESCRIPTION OF THE DRAWINGS

The present invention will be described in detail below with reference to the accompanying drawings, in which.

DETAILED DESCRIPTION

[Embodiment]

Figure 1:
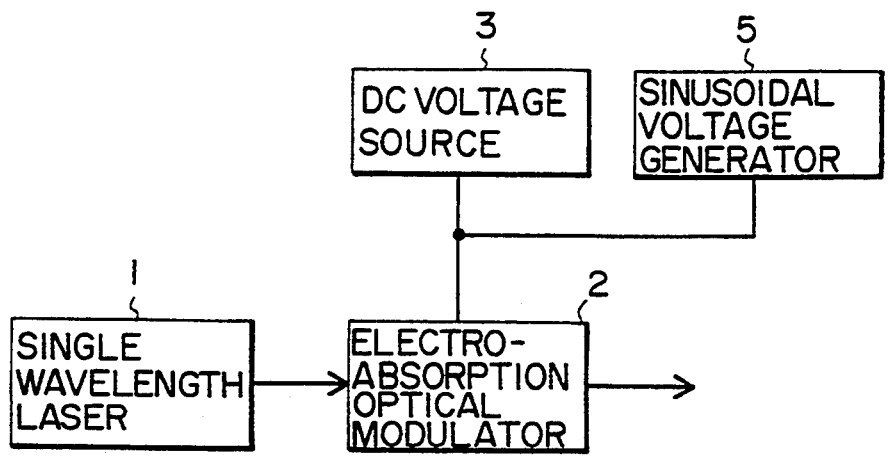
FIG. 1 is a block diagram explanatory of the principles of an optical gate operation.

A description will be given first of a bias point of the optical gate operation. In FIG. 1, fixed output light from a single wavelength laser 1 is launched into an InGaAsP electroabsorption type optical modulator 2. Consider a construction where a modulating voltage 22, which is consisting of a sinusoidal voltage generated by a sinusoidal voltage generator 5 plus a proper bias voltage generated by a DC voltage source 3, is supplied to an electroabsorption optical modulator 2.

Figure 2:
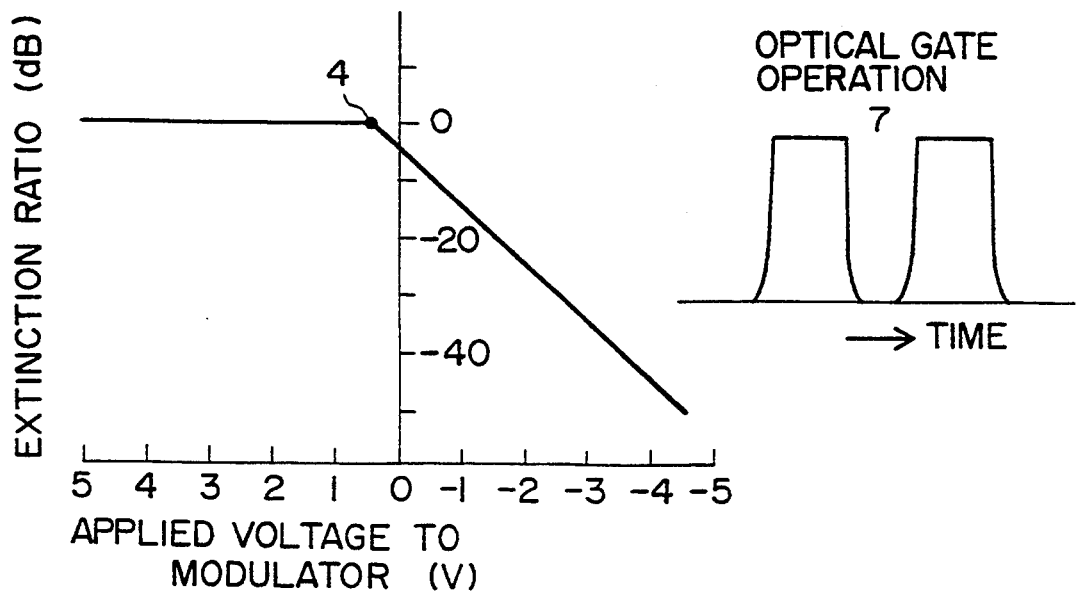
FIG. 2 is a diagram explanatory of the principles of the optical gate operation in terms of the extinction characteristic of an electroabsorption optical modulator.
Figure 2:
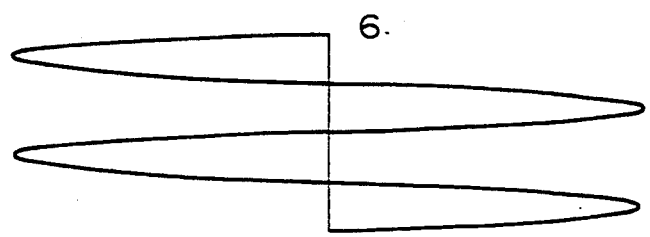

As shown in FIG. 2, when the forbidden band wavelength of an InGaAsP modulating waveguide layer is set in the range of 1.44 to 1.5 $\mu$m in the InGaAsP electroabsorption type optical modulator 2, the extinction ratio, scaled in dB, usually bears virtually linear relationship to the applied voltage in the region below +0.5 V or so, and in the region above +0.5 V or so the transmitted light intensity becomes constant. Setting the bias voltage in the vicinity of +0.5 V, the electroabsorption optical modulator 2 outputs light of a fixed intensity only when the supplied voltage exceeds +0.5 V, but when the supplied voltage is less than +0.5 V, it rapidly diminishes its optical output, resulting in generating optical pulses. In other words, the electroabsorption optical modulator 2 can be regarded as an optical gate that cuts out pulses from light of a fixed intensity. When applying to the electroabsorption optical modulator 2 a modulating voltage 6 which is a sinusoidal voltage superimposed on a DC bias voltage of +0.5 V or above, it performs an optical gate operation 7 in which the optical gate is completely ON for a period one-half or more of the pulse repetition period.

Figure 3:
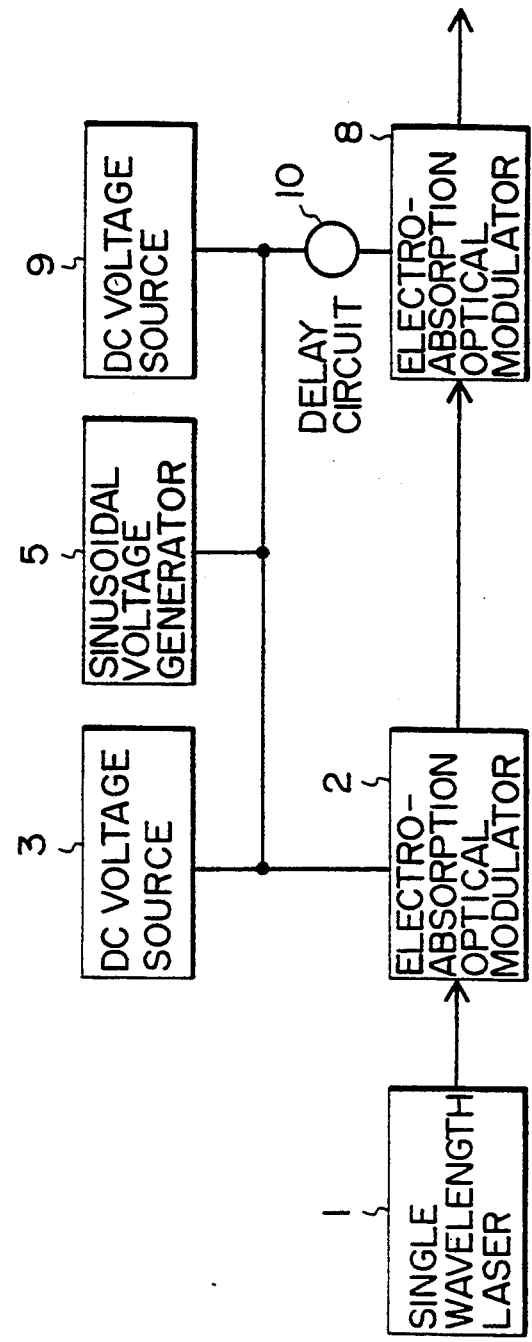
FIG. 3 is a block diagram illustrating the general construction of an optical pulse generating device according to the present invention.
Figure 4:
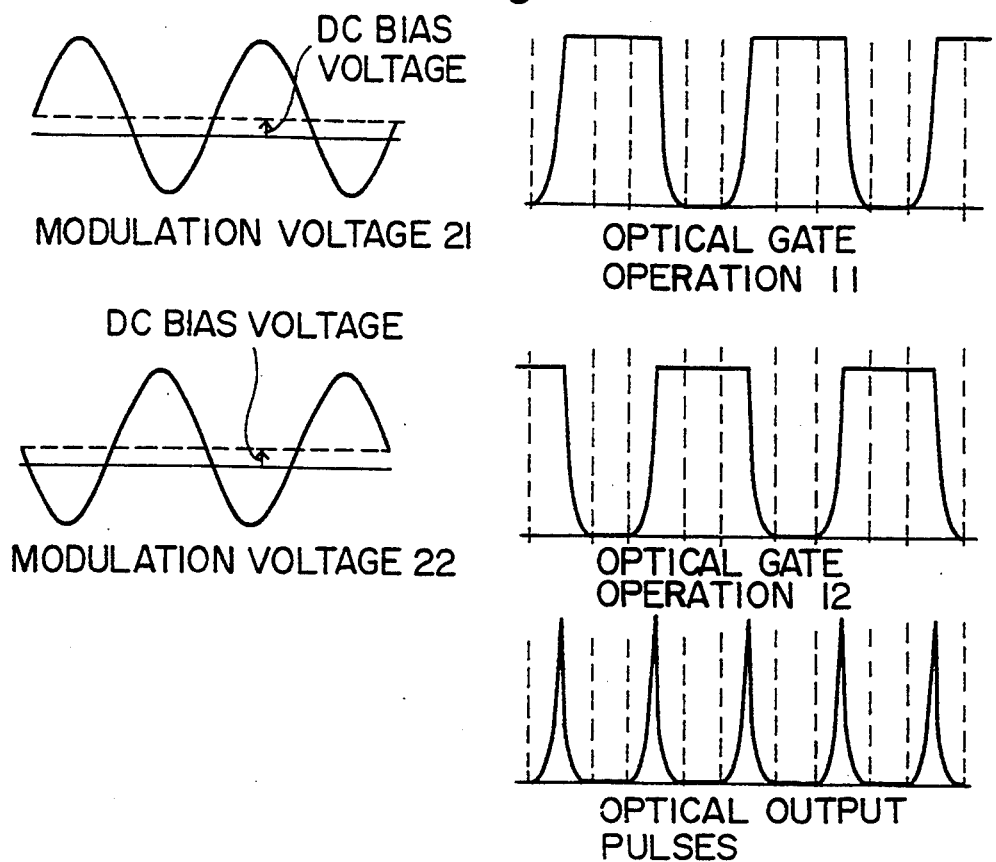
FIG. 4 is a waveform diagram explanatory of the principles of generation of optical short pulses in an embodiment of the present invention.

FIG. 3 is a block diagram of an optical pulse generating device according to an embodiment of the present invention and FIG. 4 a diagram explanatory of the principles of generation of optical short pulses. Fixed Intensity light of a 1.55 $\mu$m wavelength, emitted from an InGaAsP $\lambda/4$ shift distributed feedback (DFB) single wavelength laser 1, is launched to a first InGaAsP electroabsorption optical modulator 2. The sinusoidal voltage output having a maximum amplitude of 10 V, supplied from a sinusoidal voltage generator 5, is split into two. The modulation voltage 21, which is consisting of one of the sinusoidal voltage output plus a DC bias voltage of +0.5 V generated by a DC voltage source 3, is supplied to the first optical modulator 2. Since presently available semiconductor electroabsorption optical modulators have an operation limit frequency of about 20 GHz, the oscillation frequency of the sinusoidal voltage generator 5 is set to 20 GHz. The first optical modulator 2 performs an optical gate operation 11 in which the optical gate is completely ON or enabled for a period one-half the pulse repetition period and rises and falls in very short times. Consequently, the first optical modulator outputs optical pulses of the same geometry as the optical gate operation 11, which are launched into a second InGaAsP electroabsorption optical modulator 8. A modulation voltage 22, which is produced by adding a DC bias voltage of +0.5 V generated by a DC voltage source 9 to another sinusoidal output voltage from the sinusoidal voltage generator 5 and passes through a delay circuit 10 (of a delay time T), is supplied to the second electroabsorption optical modulator 8. The delay circuit 10, which is composed of a coaxial cable or the like, has its delay time T set to 25 picoseconds, in order to invert the phase completely with respect to another modulation voltage 21. Thus, the second modulator 8 performs an optical gate operation 12 which is 180 degrees out of phase with the optical gate operation 11 of the first modulator 2.

Figure 5:
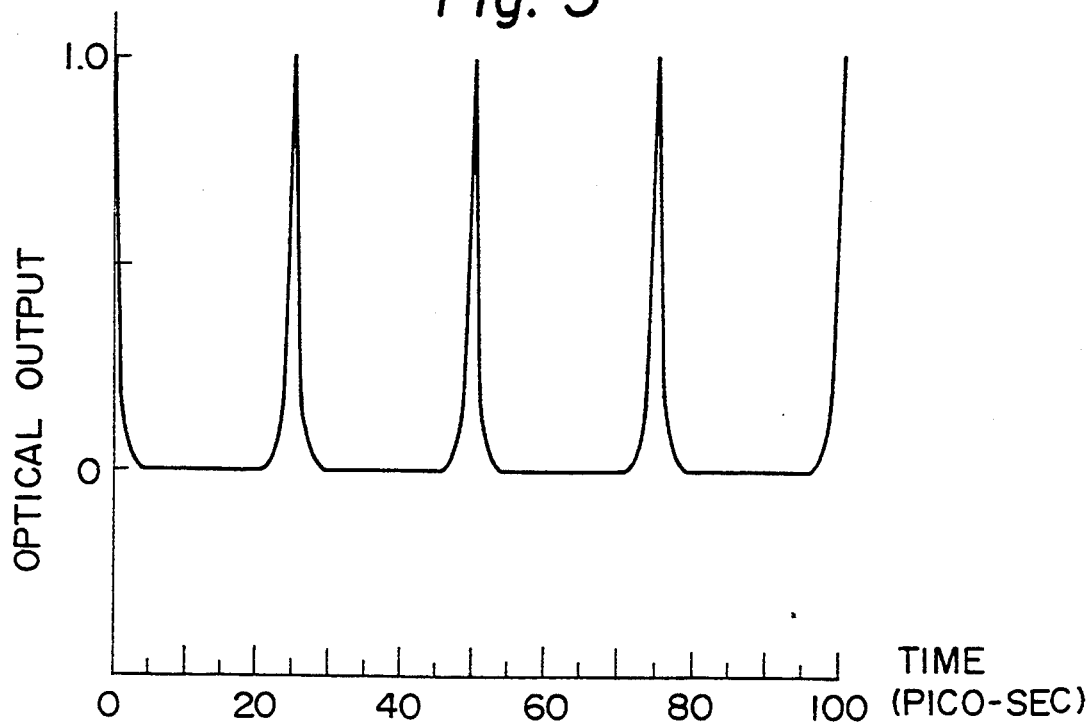
FIG. 5 is a waveform diagram showing the results of simulation of the light output from the optical pulse generating device according to the present invention.

The optical gate operations 11 and 12 are common only in their rise and fall timing. Since the output pulses, generated by the first electroabsorption optical modulator 2, are cut out except rise and fall portions, a two-fold repetition frequency of 40 GHz is obtained. The results of simulation are shown in FIG. 5. Although the optical pulse generating device is driven by a sinusoidal voltage, the pulse width of its optical output pulse is as small as less than 2 picoseconds, i.e. less than 8% of the repetition period. The bias voltage was set to +0.5 V, but a pulse width larger than 2 picoseconds could be obtained simply by applying a bias voltage higher than +0.5 V. As a test result of computer simulation for this embodiment, a pulse width of 0.95 picoseconds, i.e. 3.8% of the repetition period was obtained.

In this embodiment the bias voltage has been set to +0.5 V because extinction of the InGaAsP electroabsorption optical modulators 2 and 8 begins at around +0.5 V, but according to the type of modulators used, extinction begins at voltages above 0 V; hence the bias voltage needs only to be set to a value above the voltage at which extinction begins.

The permissible range of the delay time in the actual driving of the device is within ±0.25 picoseconds when the oscillation frequency of the sinusoidal voltage generator is 20 GHz and within ±0.5 picoseconds when the oscillation frequency is 10 GHz; these values are fully practicable.

The feature of this embodiment resides in the generation of optical short pulse of a repetition frequency twice higher than the operation limit frequency of the semiconductor electroabsorption optical modulator through utilization of the generation of optical short pulses of a repetition frequency twice higher than the oscillation frequency of the sinusoidal voltage generator.

Since no optical resonator is used, the device of the present invention has advantages, in addition to those described above in respect to the embodiment, such as the stability of operation against temperature, vibration and other environmental changes, the ability to change the modulation rate simply by changing the oscillation frequency of the sinusoidal voltage generators, the ability to easily change the pulse width by controlling the bias voltage, and the ability to easily generate optical short pulses with no excess spectrum spreading by the sinusoidal voltage without using a specific microwave voltage generator.

In the above the present invention has been described in connection with the case of using an InGaAsP electroabsorption optical modulator, but since all kinds of intensity modulators can be used in the present invention, their constructions and materials do not matter. Hence, it is possible to employ dielectric optical modulators using $LiNbo_3$ or the like as well as the semiconductor optical modulators, including an absorption optical modulator of a quantum well structure having its quantum well layer formed by InGaAsP or InGaAs and its quantum barrier layer formed by InP or InGaAsP of a larger bandgap band energy than that of the quantum well layer and an absorption optical modulator of an InGaAlAs/InAlAs, InGaAs/InAlAs quantum well structure.

It is also possible to integrate two or more of the laser and the modulators in an arbitrary combination, in which case an optical pulse generating device of a very small insertion loss is obtained which produces the same effects as mentioned above.

While in the above the present invention has been described as being applied to the optical pulse generating device for soliton optical communication, the invention is equally applicable to an optical clock generating device in an optical information processing system, an ultra-high speed pulsed light source for photomerry and an light source for optical sampling.

The present invention has such a construction as described above, and hence produces the merits mentioned below.

The optical pulse generating device permits easy generation of optical short pulses of up to a repetition frequency twice higher than the operation limit frequency of the optical modulators used, and hence is very promising as an ultra-high speed optical pulse generating device.

When applied in soliton optical communication, the device of the present invention permits doubling of the transmission rate, which makes it possible to cope with future large-capacity fiber optical communications. In optical information processing system, the clock frequency can be doubled and it can be expected to double the throughput, i.e. the quantity of information processed per unit time. Moreover, in the ultra-high speed pulsed light source for photometry and the light source for optical sampling, time resolution increases, accordingly, it can be expected that transient phenomena unobservable so far can be observed. Thus, the effect of generating optical short pulses of up to a repetition frequency twice higher than the operation limit frequency of the optical modulators used is of great utility.

What we claim is:

1. An optical pulse generating device, comprising:
   a continuously oscillating semiconductor laser;
   a first semiconductor electroabsorption optical modulator for performing intensity modulation of the output light of said semiconductor laser;
   a second electroabsorption optical modulator for performing intensity modulation of the output light from said first electroabsorption optical modulator;
   a sinusoidal voltage generator for generating a sinusoidal voltage for driving said first and second electroabsorption optical modulators;
   a DC voltage generator for applying a DC bias voltage to said first and second electroabsorption optical modulators; and
   a delay circuit inserted between said second electroabsorption optical modulator and said sinusoidal voltage generator for delaying said sinusoidal voltage from said sinusoidal voltage generator for a period of time corresponding to its phase reversal.

2. An optical pulse generator device according to claim 1, in which said DC voltage generator generates the DC bias voltage of zero volt.

3. An optical pulse generator device according to claim 1, in which said DC voltage generator generates a forward DC bias voltage as the DC bias voltage with respect to said modulators.

* * * * *